(12) United States Patent  
Morrison et al.

(10) Patent No.: US 8,669,959 B2  
(45) Date of Patent: Mar. 11, 2014

(54) PASSIVE TOUCH SYSTEM AND METHOD OF DETECTING USER INPUT

(71) Applicant: SMART Technologies ULC, Calgary (CA)

(72) Inventors: Gerald Morrison, Calgary (CA); Mavinder Singh, Calgary (CA)

(73) Assignee: SMART Technologies ULC (CA)

( * ) Notice: Subject to any disclaimer, the term of this patent is extended or adjusted under 35 U.S.C. 154(b) by 0 days.

(21) Appl. No.: 13/768,406

(22) Filed: Feb. 15, 2013

(65) Prior Publication Data

US 2013/0155029 A1 Jun. 20, 2013

Related U.S. Application Data

(60) Continuation of application No. 12/829,175, filed on Jul. 1, 2010, now Pat. No. 8,378,986, which is a continuation of application No. 11/468,937, filed on Aug. 31, 2006, now Pat. No. 7,755,613, which is a division of application No. 10/995,377, filed on Nov. 24, 2004, now Pat. No. 7,236,162, which is a division of application No. 10/408,671, filed on Apr. 8, 2003, now abandoned, which is a continuation of application No. 09/610,481, filed on Jul. 5, 2000, now Pat. No. 6,803,906.

(51) Int. Cl.  
*G09G 5/00* (2006.01)

(52) U.S. Cl.  
USPC .......................................... 345/173; 345/175

(58) Field of Classification Search  
USPC ..................... 345/156, 167, 168, 173–179; 178/18.01–18.09  
See application file for complete search history.

(56) References Cited

U.S. PATENT DOCUMENTS 6,760,009 B2 * 7/2004 Omura et al. ................. 345/156  
6,829,372 B2 * 12/2004 Fujioka ...................... 178/18.01

\* cited by examiner

*Primary Examiner* — Regina Liang  
(74) *Attorney, Agent, or Firm* — Katten Muchin Rosenman LLP

(57) ABSTRACT

A passive touch system includes a passive touch surface and at least two cameras associated with the touch surface. The at least two cameras acquire images of the touch surface from different locations and have overlapping fields of view. A processor receives and processes images acquired by the at least two cameras to detect the existence of a pointer therein and to determine the location of the pointer relative to the touch surface. Actual pointer contact with the touch surface and pointer hover above the touch surface can be determined.

17 Claims, 13 Drawing Sheets

PERPENDICULAR POINTER APPROACHING TOUCH SURFACE
CALCULATED CENTER LINE SHOWS EXPECTED POINT OF CONTACT.

PERPENDICULAR POINTER IN CONTACT WITH TOUCH SURFACE

NON-PERPENDICULAR POINTER APPROACHING TOUCH SURFACE
CALCULATED CENTER LINE SHOWS EXPECTED POINT OF CONTACT.

NON-PERPENDICULAR POINTER IN CONTACT WITH TOUCH SURFACE.

PASSIVE TOUCH SYSTEM AND METHOD OF DETECTING USER INPUT

This application is a continuation of U.S. patent application Ser. No. 12/829,175, filed Jul. 1, 2010, now U.S. Pat. No. 8,378,986, issued Feb. 19, 2013, which is a continuation of U.S. patent application Ser. No. 11/468,937, filed Aug. 31, 2006, now U.S. Pat. No. 7,755,613, issued Jul. 13, 2010, which is a divisional of U.S. patent application Ser. No. 10/995,377, filed Nov. 24, 2004, now U.S. Pat. No. 7,236,162, issued Jun. 26, 2007, which is a divisional of U.S. patent application Ser. No. 10/408,671, filed Apr. 8, 2003 (now abandoned), which is a continuation of U.S. patent application Ser. No. 09/610,481, filed Jul. 5, 2000, now U.S. Pat. No. 6,803,906, issued Oct. 12, 2004, the contents of each being incorporated herein by reference.

FIELD OF THE INVENTION

The present invention relates generally to input devices and in particular to a passive touch system and method of detecting user input.

BACKGROUND OF THE INVENTION

Touch systems are well known in the art and typically include a touch screen having a touch surface on which contacts are made using a pointer in order to generate user input. Pointer contacts with the touch surface are detected and are used to generate corresponding output depending on areas of the contact surface where the contacts are made. There are basically two general types of touch systems available and they can be broadly classified as "active" touch systems and "passive" touch systems.

Active touch systems allow a user to generate user input by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate user input by contacting the touch surface with a passive pointer and do not require the use of a special pointer in order to activate the touch surface. A passive pointer can be a finger, a cylinder of some material, or any suitable object that can be used to contact some predetermined area of interest on the touch surface.

Passive touch systems provide advantages over active touch systems in that any suitable pointing device, including a user's finger, can be used as a pointer to contact the touch surface. As a result, user input can easily be generated. Also, since special active pointers are not necessary in passive touch systems, battery power levels and/or pointer damage, theft, or misplacement are of no concern to users.

Passive touch systems have a number of applications relating to computer operation and video display. For example, in one interactive application, as is disclosed in U.S. Pat. No. 5,448,263 to Martin, assigned to the assignee of the present invention, the passive touch system is coupled to a computer and the computer display is projected onto the touch surface of the touch screen. The coordinates representing specific locations on the touch surface are mapped to the computer display. When a user contacts the touch surface, the coordinates of the contact are fed back to the computer and mapped to the computer display thereby allowing the user to operate the computer in a manner similar to using a computer mouse simply by contacting the touch surface. Furthermore, the coordinates fed back to the computer can be recorded in an application and redisplayed at a later time. Recording contact coordinates is typically done when it is desired to record information written or drawn on the touch surface by the user.

The resolution of a passive touch screen determines if the touch system is suitable for recording information written or drawn on the touch screen or only useful for selecting areas on the touch screen mapped to large regions on the computer or video display in order to manipulate the computer or video display. Resolution is typically measured in dots per inch (DPI). The DPI is related to the size of the touch screen and the sampling ability of the touch system hardware and software used to detect contacts on the touch surface.

Low-resolution passive touch screens only have enough DPI to detect contacts on the touch surface within a large group of pixels displayed by the computer or video system. Therefore, these low-resolution passive touch screens are useful only for manipulating the computer or video display.

On the other hand, high-resolution passive touch screens have sufficient DPI to detect contacts that are proportional to a small number of pixels or sub-pixels of the computer or video display. However, a requirement for high-resolution touch screens is the ability to detect when the pointer is in contact with the touch surface. This is necessary for writing, drawing, mouse-click operations, etc. Without the ability to detect pointer contact with the touch screen, writing and drawing would be one continues operation, and mouse clicks would not be possible thereby making computer display manipulation impossible. A secondary requirement is the ability to detect when the pointer is "hovering" above the touch surface. Although not required for writing or drawing, today's computer operating systems are increasingly using hover information to manipulate computer or video displays or pop-up information boxes.

Passive touch screens are typically either of the analog resistive type, Surface Acoustic Wave (SAW) type or capacitive type. Unfortunately, these touch screens suffer from a number of problems or shortcomings as will be described.

Analog resistive touch screens typically have a high-resolution. Depending on the complexity of the touch system, the resolution of the touch screen can produce 4096×4096 DPI or higher. Analog resistive touch screens are constructed using two flexible sheets that are coated with a resistive material and arranged as a sandwich. The sheets do not come into contact with each other until a contact has been made. The sheets are typically kept separated by insulating microdots or by an insulating air space. The sheets are constructed from ITO, which is mostly transparent. Thus, the touch screen introduces some image distortion but very little parallax.

During operation of an analog resistive passive touch screen, a uniform voltage gradient is applied in one direction along a first of the sheets. The second sheet measures the voltage along the first sheet when the two sheets contact one another as a result of a contact made on the touch surface. Since the voltage gradient of the first sheet can be translated to the distance along the first sheet, the measured voltage is proportional to the position of the contact on the touch surface. When a contact coordinate on the first sheet is acquired, the uniform voltage gradient is then applied to the second sheet and the first sheet measures the voltage along the second sheet. The voltage gradient of the second sheet is proportional to the distance along the second sheet. These two contact coordinates represent the X-Y position of the contact on the touch surface in a Cartesian coordinate system.

Since mechanical pressure is required to bring both sheets into contact, analog resistive touch screens can only detect contact when there is sufficient pressure to bring the two sheets together. Analog resistive passive touch screens cannot sense when a pointer is hovering over the touch surface. Therefore, contact events and positions can only be detected when actual contacts are made with the touch surface.

Surface Acoustic Wave (SAW) touch screens typically provide for medium resolution and are not suitable for recording good quality writing. SAW touch screens employ transducers on the borders of a glass surface to vibrate the glass and produce acoustic waves that ripple over the glass surface. When a contact is made on the glass surface, the waves reflect back and the contact position is determined from the signature of the reflected waves.

Unfortunately, SAW touch screens exhibit noticeable parallax due to the thickness of the vibrating glass which is placed over the surface of the video or computer display. Also, contact events and positions can only be detected when actual contacts are made with the glass surface. Furthermore, SAW touch screens do not scale beyond a few feet diagonal.

Capacitive touch screens provide for low resolution because contacts can only be determined in large areas (approximately ½"×½"). As a result, capacitive touch screens cannot be used for recording writing or drawing and are suitable for selecting areas on the touch screen corresponding to computer generated buttons displayed on the video or computer display. These touch screens also suffer disadvantages in that they are sensitive to temperature and humidity. Similar to analog resistive touch screens and SAW touch screens, capacitive touch screens can also only detect contact events and positions when actual contacts are made with the touch surface.

Scalability of passive touch screens is important since the demand for larger electronic digitizers is increasing. Where digitizers were once small desktop appliances, today they have found there way onto electronic whiteboarding applications. The need to build a passive touch sensitive "wall" has become a requirement for new touch screen applications. Existing passive touch screens of the types discussed above are all limited in the maximum size where they are still functional.

As will be appreciated, improvements to passive touch systems are desired. It is therefore an object of the present invention to provide a novel passive touch system and method of detecting user input.

SUMMARY OF THE INVENTION

According to one aspect of the present invention there is provided a passive touch system comprising:

a passive touch surface;

at least two cameras associated with said touch surface, said at least two cameras acquiring images of said touch surface from different locations and having overlapping fields of view; and a processor receiving and processing images acquired by said at least two cameras to detect the existence of a pointer therein and to determine the location of said pointer relative to said touch surface.

In a preferred embodiment, the at least two cameras are two-dimensional image sensor and lens assemblies having fields of view looking along the plane of the touch surface. The processor determines the location of the pointer relative to the touch screen using triangulation. The processor also determines when the pointer is in contact with the touch surface and when the pointer is hovering above the touch surface.

In one embodiment, the processor selects pixel subsets of images acquired by the image sensor and lens assemblies and processes the pixel subsets to determine the existence of the pointer. The processor includes a digital signal processor associated with each image sensor and lens assembly and a master digital signal processor in communication with the digital signal processors. The digital signal processors associated with each image sensor and lens assembly select the pixel subsets and process the pixel subsets to determine the existence of the pointer. The master digital signal processor receives pixel characteristic data from the digital signal processors and triangulates the pixel characteristic data to determine the location of the pointer relative to the touch surface.

According to another aspect of the present invention there is provided a method of detecting the position of a pointer relative to a passive touch surface comprising the steps of:

acquiring images of said touch surface from different locations using cameras having overlapping fields of view; and processing said images to detect the existence of a pointer therein and to determine the location of said pointer relative to said touch surface.

The present invention provides advantages in that the passive touch system is of high resolution and allows actual pointer contacts with the touch surface as well as pointer hovers above the touch surface to be detected and corresponding output generated. Also, the present passive touch system provides advantages in that it does not suffer from parallax, image distortion, pointer position restrictions, image projection and scalability problems that are associated with prior art passive touch systems.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
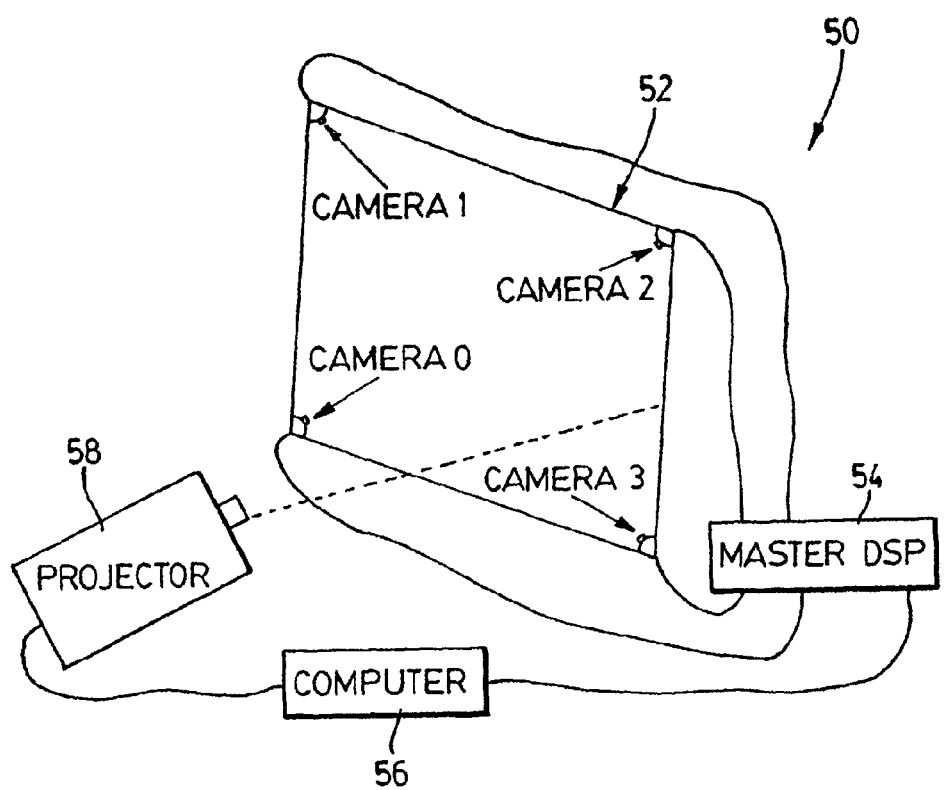
FIG. 1 is a schematic diagram of a passive touch system in accordance with the present invention.

Turning now to FIG. 1, a passive touch system in accordance with the present invention is shown and is generally indicated to by reference numeral 50. As can be seen, passive touch system 50 includes a touch screen 52 coupled to a master controller 54. Master controller 54 is also coupled to a computer 56. Computer 56 executes one or more application programs and provides display output that is projected onto the touch screen 52 via a projector 58. The touch screen 52, master controller 54, computer 56 and projector 58 form a closed-loop so that user contacts with the touch screen 52 can be recorded as writing or drawing or used to control execution of application programs executed by the computer 56.

Figure 2:
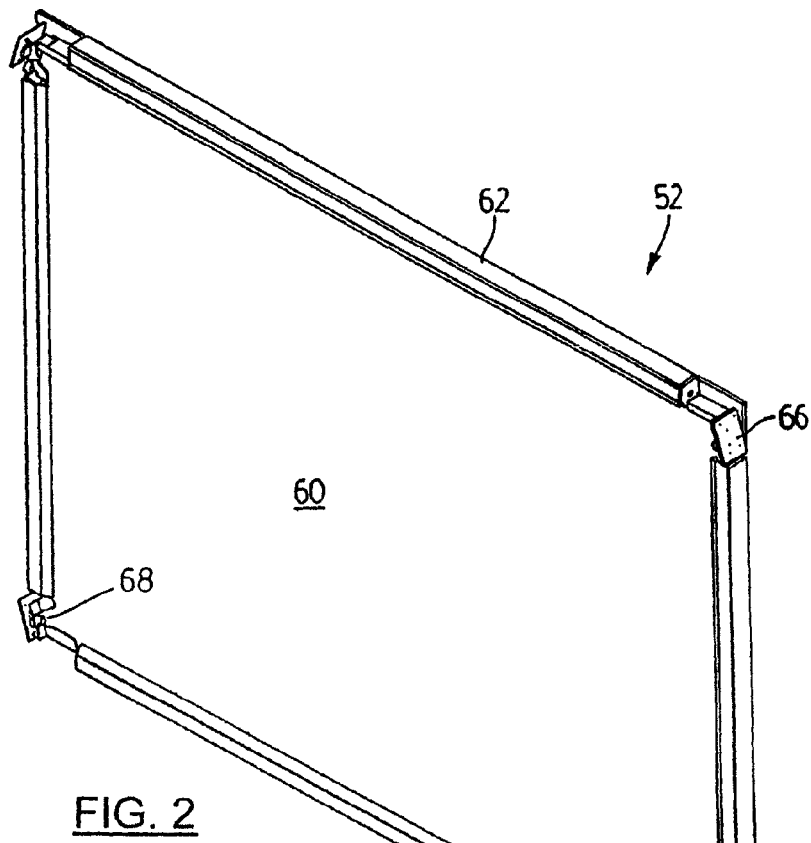
FIG. 2 is an isometric view of a touch screen forming part of the passive touch system of FIG. 1.
Figure 3:
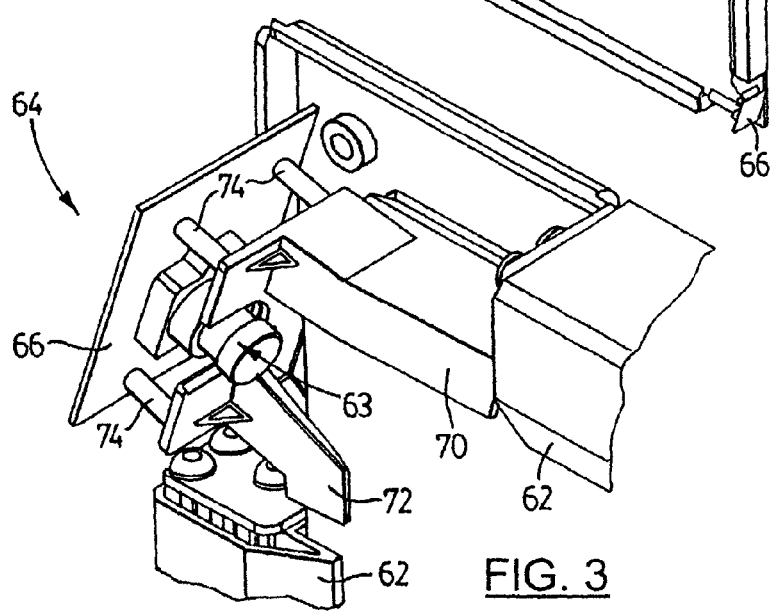
FIG. 3 is an isometric view of a corner portion of the touch screen of FIG. 2.
Figure 4:
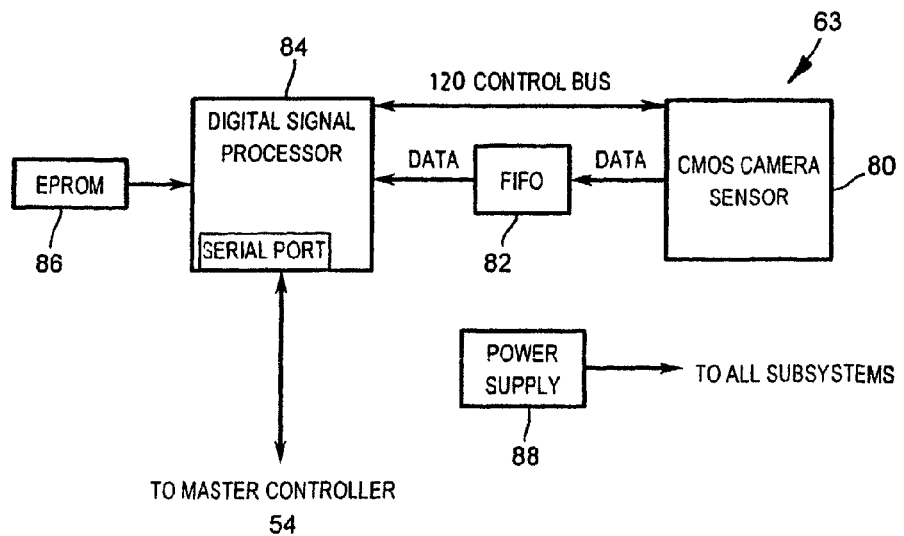
FIG. 4 is a schematic diagram of a camera assembly forming part of the touch screen of FIG. 2.

FIGS. 2 to 4 better illustrate the touch screen 52. Touch screen 52 includes a touch surface 60 bordered by a frame 62. Touch surface 60 is passive and is in the form of a rectangular planar sheet of material. Camera subsystems are associated with each corner of the touch screen 52. Each camera subsystem includes a camera assembly 63 mounted adjacent a different corner of the touch screen 52 by a frame assembly 64. Each frame assembly 64 includes an angled support plate 66 on which the camera assembly 63 is mounted. Supporting frame elements 70 and 72 are mounted on the plate 66 by posts 74 and secure the plate 66 to the frame 62.

Each camera assembly 63, in this embodiment, includes a camera in the form of a two-dimensional CMOS camera image sensor and associated lens assembly 80, a first-in-first-out (FIFO) buffer 82 coupled to the image sensor and lens assembly 80 by a data bus and a digital signal processor (DSP) 84 coupled to the FIFO 82 by a data bus and to the image sensor and lens assembly 80 by a control bus. A boot EPROM 86 and a power supply subsystem 88 are also included.

In the present embodiment, the CMOS camera image sensor is a Photobit PB300 image sensor configured for a 20×640 pixel subarray that can be operated to capture image frames at rates in excess of 200 frames per second. The FIFO buffer 82 is manufactured by Cypress under part number CY7C4211V and the DSP 84 is manufactured by Analog Devices under part number ADSP2185M.

The DSP 84 provides control information to the image sensor and lens assembly 80 via the control bus. The control information allows the DSP 84 to control parameters of the image sensor and lens assembly 80 such as exposure, gain, array configuration, reset and initialization. The DSP 84 also provides clock signals to the image sensor and lens assembly 80 to control the frame rate of the image sensor and lens assembly 80.

Figure 5:
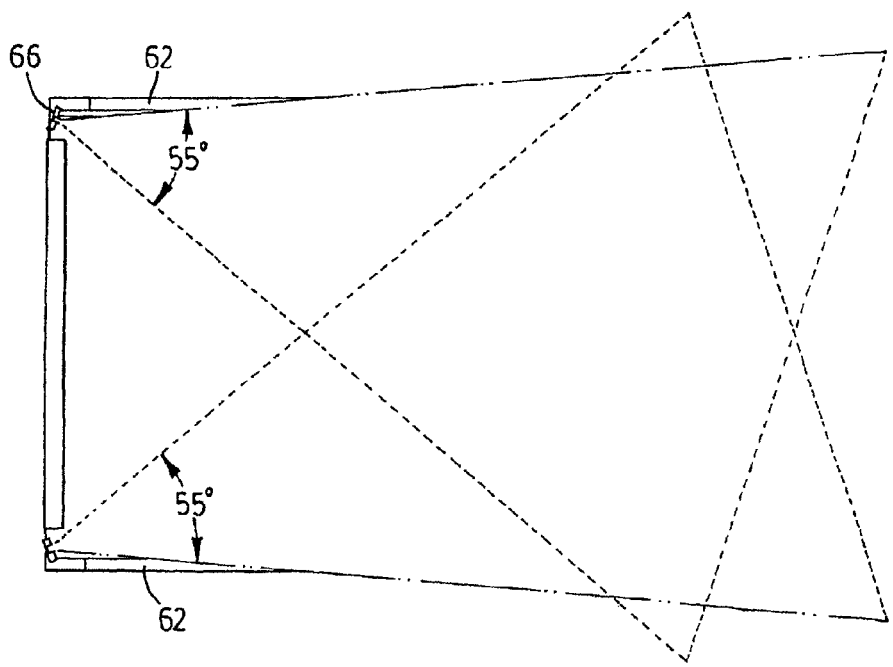
FIG. 5 is a front elevational view of the touch screen of FIG. 2 showing the fields of view of two camera assemblies.

As shown in FIG. 5, each image sensor and lens assembly 80 has a 55° field of view. The angle of the plate 66 is selected so that the field of view of each image and lens assembly 80 includes at least the majority of a different peripheral edge of the touch surface 60. In this way, the entire touch surface 60 is within the fields of view of the image sensor and lens assemblies 80.

Figure 6:
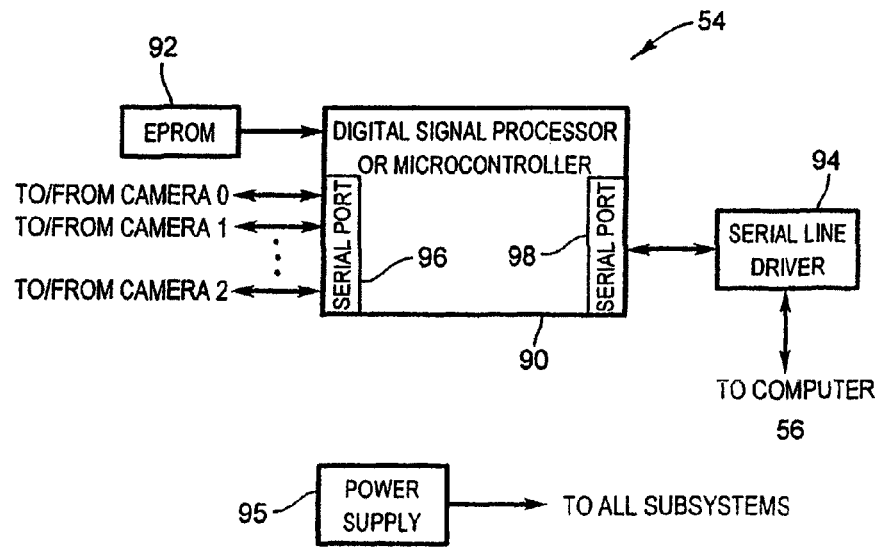
FIG. 6 is a schematic diagram of a master controller forming part of the passive touch system of FIG. 1.

Master controller 54 is best illustrated in FIG. 6 and includes a DSP 90, a boot EPROM 92, a serial line driver 94 and a power supply subsystem 95. The DSP 90 communicates with the DSPs 84 of the camera assemblies 63 over a data bus through a serial port 96 and communicates with the computer 56 over a data bus through a serial port 98 and the serial line driver 94. In this embodiment, the DSP 90 is also manufactured by Analog Devices under part number ADSP2185M. The serial line driver 94 is manufactured by Analog Devices under part number ADM222.

The master controller 54 and each camera assembly 63 follow a communication protocol that enables bi-directional communications via a common serial cable similar to a universal serial bus (USB). The transmission bandwidth is divided into thirty-two (32) 16-bit channels. Of the thirty-two channels, five (5) channels are assigned to each of the DSPs 84 in the camera assemblies 63 and to the DSP 90 in the master controller 54 and the remaining seven (7) channels are unused. The master controller 54 monitors the twenty (20) channels assigned to the camera assembly DSPs 84 while the DSPs 84 in the camera subsystems 63 monitor the five (5) channels assigned to the master controller DSP 90. Communications between the master controller 54 and the camera assemblies 63 are performed as background processes in response to interrupts.

The general operation of the passive touch system 50 will now be described. Each camera assembly 63 acquires images of the touch surface 60 within the field of view of its image sensor and lens assembly 80 at the frame rate established by the DSP clock signals and processes the images to determine if a pointer is in the acquired images. If a pointer is in the acquired images, the images are further processed to determine characteristics of the pointer contacting or hovering above the touch surface 60. Pointer characteristics are then converted into pointer information packets (PIPs) and the PIPs are queued for transmission to the master controller 54. The camera assemblies 63 also receive and respond to diagnostic PIPs generated by the master controller 54.

The master controller 54 polls the camera assemblies 63 at a set frequency (in this embodiment 70 times per second) for PIPs and triangulates pointer characteristics in the PIPs to determine pointer position data. The master controller 54 in turn transmits pointer position data and/or status information to the personal computer 56. In this manner, the pointer position data transmitted to the personal computer 56 can be recorded as writing or drawing or can be used to control execution of application programs executed by the computer 56. The computer 56 also updates the display output conveyed to the projector 58 so that information projected onto the touch surface 60 reflects the pointer activity.

The master controller 54 also receives commands from the personal computer 56 and responds accordingly as well as generates and conveys diagnostic PIPs to the camera assemblies 63.

Specifics concerning the processing of acquired images and the triangulation of pointer characteristics in PIPs will now be described with particular reference to FIGS. 7 to 13.

Initially, an alignment routine is performed to align the image sensor and lens assemblies 80. During the alignment routine, a pointer is held in the approximate center of the touch surface 60. Subsets of the pixels of the image sensor and lens assemblies 80 are then selected until a subset of pixels for each image sensor and lens assembly 80 is found that captures the pointer and the pointer tip on the touch surface 60. This alignment routine allows for a relaxation in mechanical mounting of the image sensor and lens assemblies on the frame assemblies 64. The identification of the pointer tip on the touch surface 60 also gives a calibration that determines the row of pixels of each image sensor and lens assembly 80 that detects actual contacts made with the touch surface. Knowing these pixel rows allows the difference between pointer hover and pointer contact to be determined.

In this embodiment, since a computer display is projected onto the touch surface 60, during the alignment routine several known coordinate locations are also displayed and the user is required to touch these coordinate locations in sequence using the pointer so that the subset of pixels for each of image sensor and lens assembly 80 includes all of the coordinate locations as well. Calibration data is then stored for reference so that pointer contacts on the touch surface 60 can be mapped to corresponding areas on the computer display.

As mentioned above, each camera assembly 63 acquires images of the touch surface 60 within its field of view. The images are acquired by the image and lens assembly 80 at intervals in response to the clock signals received from the DSP 84. Each image acquired by the image and lens assembly 80 is sent to the FIFO buffer 82.

Figure 14:
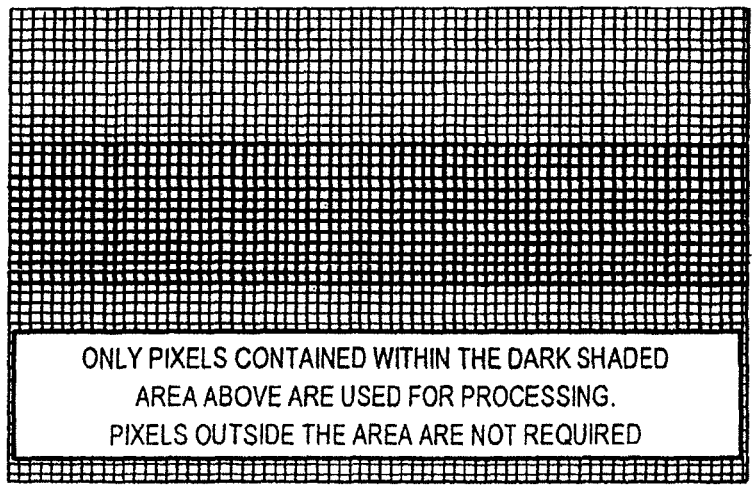
FIG. 14 shows an acquired image and a pixel subset of the image that is processed.

The DSP 84 in turn reads each image from the FIFO buffer 82 and processes the image to determine if a pointer is located in the image and if so, to extract the pointer and related pointer statistical information. To avoid processing significant numbers of pixels containing no useful information, only the subset of the pixels in the image determined during the alignment routine are actually processed as is shown in FIG. 14.

Figure 7:
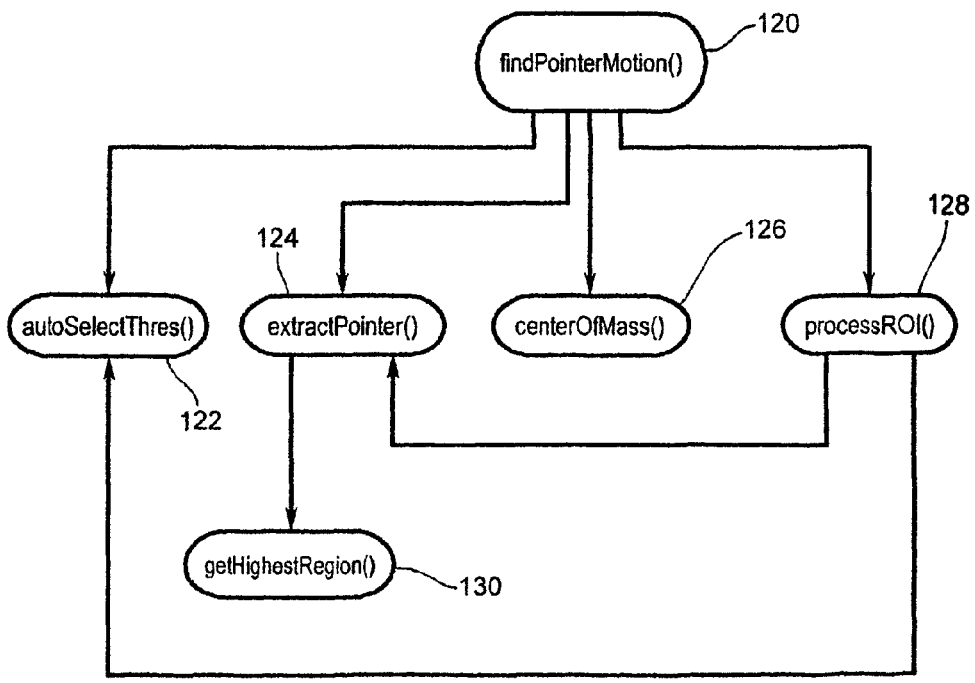
FIG. 7 is case diagram showing functions executed by the camera assemblies.

In order to determine if a pointer is located in the image and extract pointer and related pointer statistical information, the DSP 84 executes a main findPointerMotion( ) function 120 that calls a number of other functions, namely an autoSelectThres( ) function 122, an extractPointer function 124, a centerOfMass( ) function 126, and a processROI( ) function 128 (see FIG. 7). The extractPointer( ) function 128 also calls a getHighestRegion( ) function 130.

Figure 8:
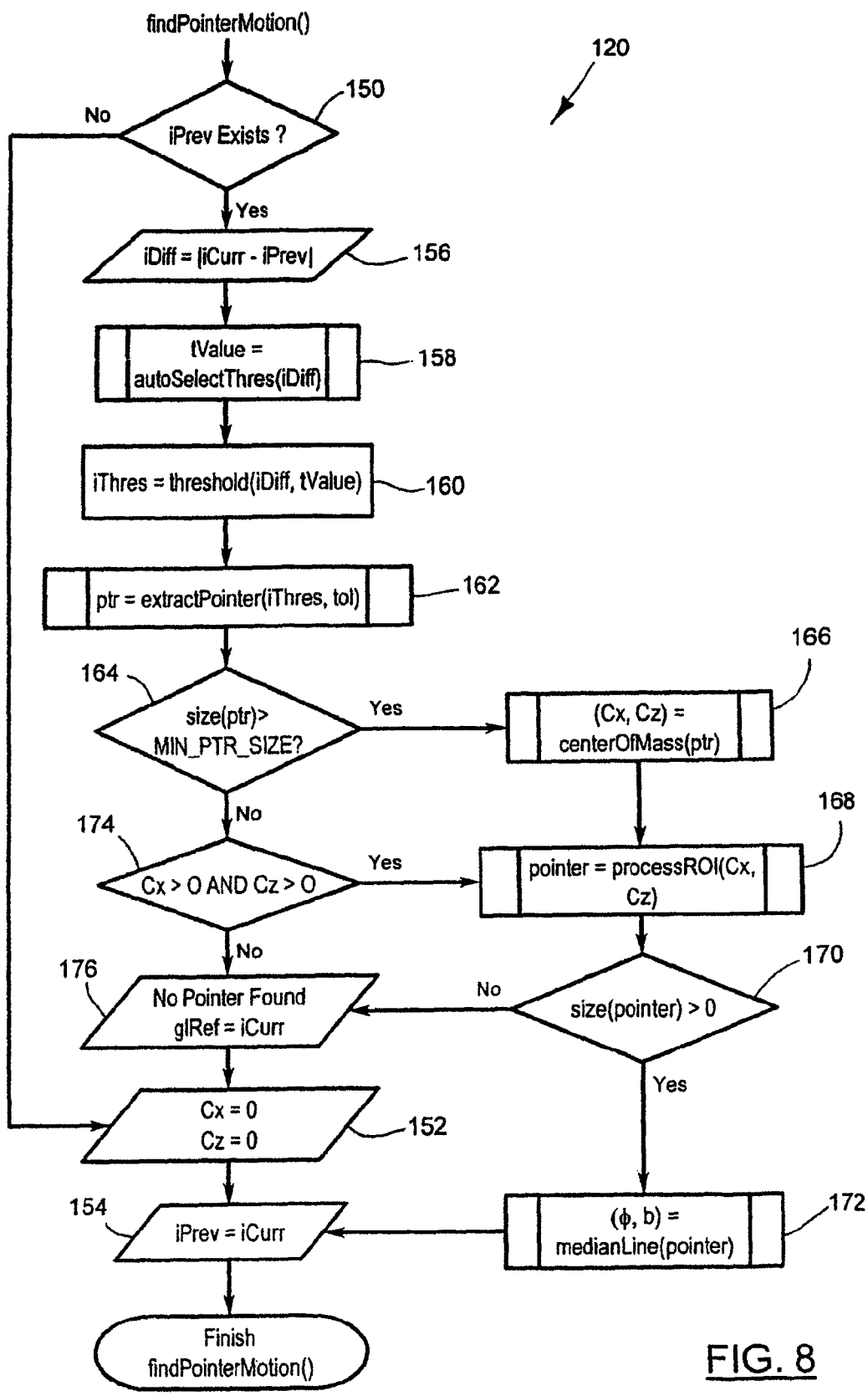
FIG. 8 is a flowchart showing the steps performed during execution of a findPointerMotion( ) function.

The findPointerMotion( ) function 120 is used to extract the pointer from the image. Turning now to FIG. 8, the steps performed during execution of the findPointerMotion( ) function 120 is shown. When the findPointerMotion( ) function is called, a check is made to determine if a previous image iPrev including a pointer exists (step 150). If no previous image iPrev exists, center of mass parameters Cx and Cz are assigned zero values (step 152). The current image iCurr being processed is then designated as the previous image iPrev (step 154) to complete the findPointerMotion( ) function.

At step 150, if a previous image iPrev exists, the current image iCurr is subtracted from the previous image iPrev and the absolute value of the difference image iDiff is taken (step 156). By forming the difference image iDiff, background features and noise are removed. The autoSelectThres( ) function 122 is then called to select a threshold value tValue for the difference image iDiff (step 158) based on the histogram of the difference image iDiff. The threshold iThres of the difference image iDiff is then taken (step 160) to highlight further the pointer within the current image iCurr. During thresholding a grayscale image is mapped to the binary difference image iDiff. Pixels in the difference image with values equal to or less than the threshold value tValue are made black while all other pixels are made white. The result is a binary image containing the pointer and some noise both designated by white pixels.

Once the difference image has been thresholded, the extractPointer function 124 is called (step 162) to extract the pointer ptr from the difference image iDiff and ignore the noise. The size of the pointer ptr is then examined to determine if it is greater than a threshold value MIN_PTR_SIZE (step 164).

If the size of the pointer is greater than the threshold value MIN_PTR_SIZE, the centerOfMass( ) function 126 is called (step 166) to determine the center of the pointer. Following this, the processROI( ) function 128 is called (step 168) to select a region of interest ROI within the difference image iDiff and extract the pointer from the region of interest.

Once the pointer has been extracted from the region of interest ROI, the size of the extracted pointer is determined (step 170). If the pointer size is greater than zero, a medianLine function is called (step 172). During execution of the medianLine function, the median line of the pointer (i.e. the pointer location within the region of interest) is calculated using linear least squares. The current image iCurr is then designated as the previous image iPrev to complete the findPointerMotion( ) function.

At step 164, if the pointer size is equal to zero, the center of mass parameters Cx and Cz are examined (step 174). If both of the center of mass parameters Cx and Cz have values greater zero, the processROI( ) function 128 is called (step 168) to select a region of interest ROI within the difference image iDiff and extract the pointer from the region of interest. At step 174, if one or both of the center of mass parameters Cx and Cz have values equal to zero or at step 170, if the size of the pointer is less than zero, a no pointer found condition is determined (step 176). At this stage, the current image iCurr is designated as a calibration image glRef. The findPointerMotion( ) function then proceeds to step 152 where the center of mass parameters Cx and Cz are assigned zero values.

As mentioned above, at step 158, when the findPointerMotion( ) function 120 calls the autoSelectThres( ) function 122, a threshold value for the difference image iDiff is selected based on the histogram of the difference image so that when the difference image iDiff is thresholded, the pointer is further highlighted from background features and noise. Selection of the threshold value in this manner is more robust than hard-coding the threshold value.

Figure 9:
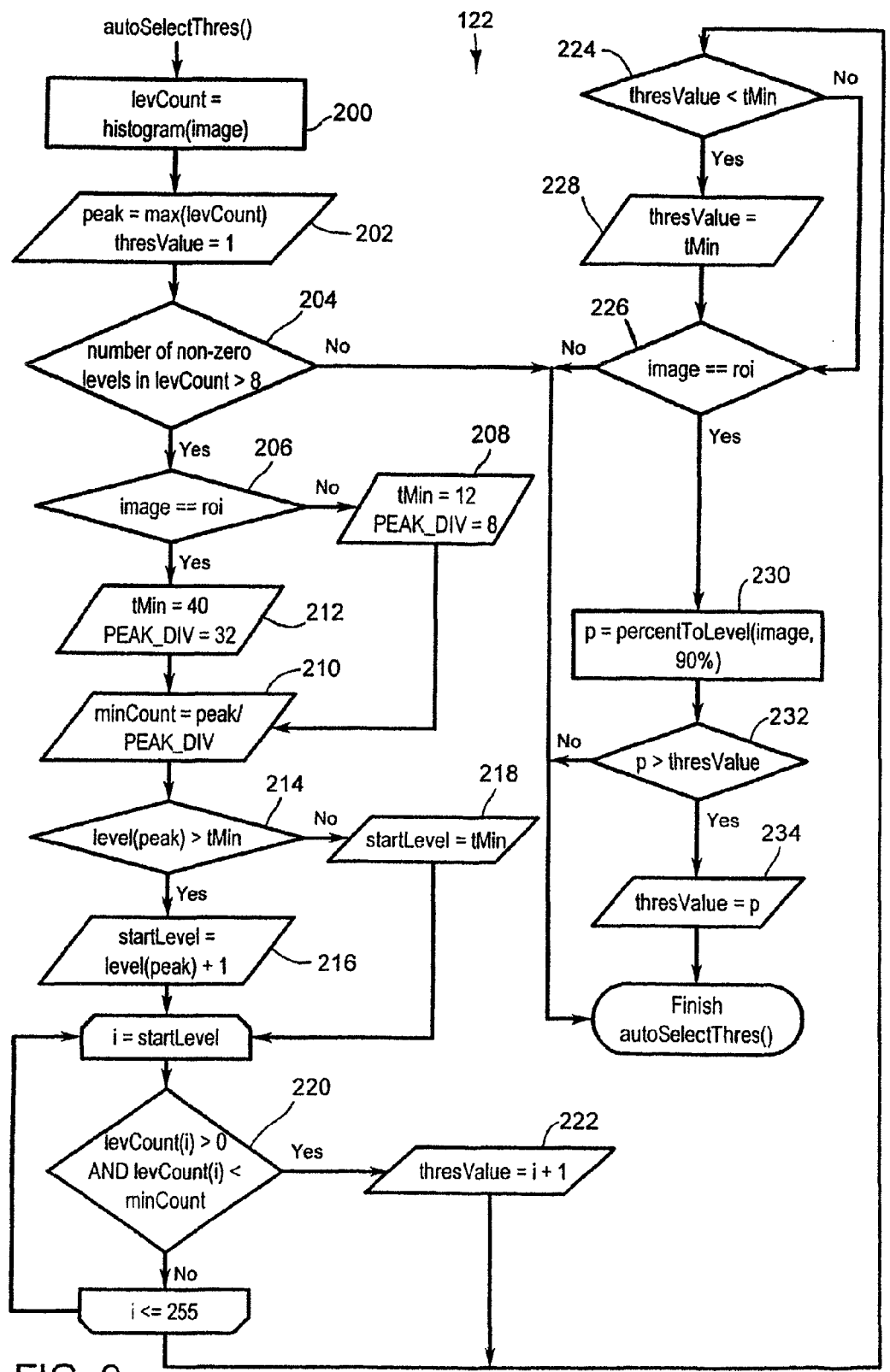
FIG. 9 is a flowchart showing the steps performed during execution of an autoSelectThres( ) function.
Figure 10:
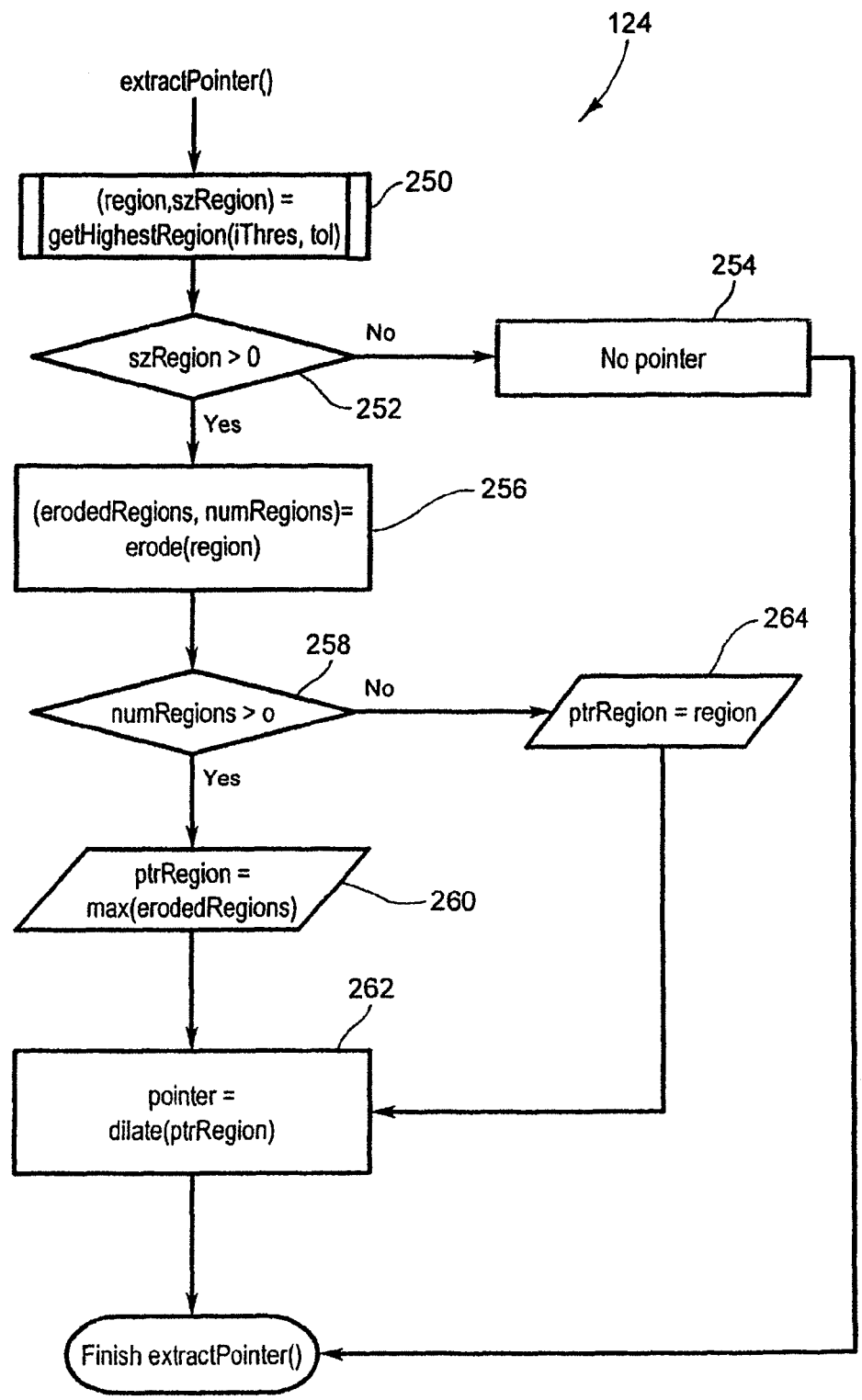
FIG. 10 is a flowchart showing the steps performed during execution of an extractPointer function.

Turning now to FIG. 9, the steps performed during execution of the autoSelectThres( ) function 122 are illustrated. As can be seen, in order to select the threshold level, a histogram of the difference image iDiff is taken and the number of pixels in each bin of the histogram are counted (step 200). The number of pixels in the bin having the highest count is used as a peak parameter and the threshold value is initially assigned a value of one (step 202). The number of bins having non-zero counts is then examined to determine if more than eight (8) bins have non-zero counts (step 204). If less than eight (8) bins have non-zero counts, the threshold value remains at its initially assigned value and the autoSelectThres( ) function is completed.

At step 204, if more than eight (8) bins have non-zero counts, the number of non-zero bins is checked again to determine if an entire difference image is being processed (i.e. the autoSelectThres( ) function was called by the findPointerMotion( ) function 120) or if a region of interest ROI within the difference image is being processed (i.e. the autoSelectThres( ) function was called by the processROI( ) function 128) (step 206). If the entire difference image iDiff is being processed, a threshold minimum parameter (tMin) is set to a value of twelve (12) and a Peak_Div parameter is set to a value of eight (8) (step 208). A minimum count parameter minCount is then calculated by dividing the peak parameter determined at step 202 by the Peak_Div parameter (step 210). If a region of interest is being processed, the threshold minimum parameter (tMin) is set to a value of forty (40) and the Peak_Div parameter is set to a value of thirty-two (32) (step 212) before proceeding to step 210.

Once minCount has been determined, the peak level is checked to determine if it is greater than the threshold minimum tMin (step 214). Peak level is the grayscale level that contains the most pixels. In the case of a tie, the grayscale level with the highest numerical value (i.e. the closest to 255) is chosen. If the peak level is greater than the threshold minimum tMin, a startLevel parameter is assigned a value equal to the peak level+1 (step 216). At step 214, if the peak level is less than the threshold minimum tMin, the startLevel parameter is assigned a value equal to the threshold minimum tMin (step 218).

Following step 216 or 218, a loop is entered. During the loop, the levCount for each bin having a bin number between the value of the startLevel parameter and two hundred and fifty-five (255) is examined to determine if it is greater than zero and if it is less than the minCount parameter determined at step 210 (step 220). If the condition is met during the loop, the loop is exited and the threshold value is assigned a value equal to the bin number having the levCount that resulted in the loop being exited+1 (step 222). If the condition is not met, the loop is exited after the levCount for bin number 255 has been checked.

Once the loop has been exited, the threshold value is checked to determine if it is less than the minimum threshold value tMin (step 224). If not, a check is again made to determine if an entire difference image is being processed or whether a region of interest ROI is being processed (step 226). If the threshold value is less than the minimum threshold value tMin, the threshold value is set equal to the minimum threshold value tMin (step 228) before the check is made to determine if an entire difference image is being processed or whether a region of interest is being processed (step 226).

At step 226, if a difference image iDiff is being processed, the autoSelectThres( ) function is completed. However, if a region of interest is being processed, a parameter p is assigned a value corresponding to the first grayscale level at which 90% or more of the pixels will go black (step 230). The parameter p is then compared to the threshold level (step 232). If the parameter p is less than the threshold level, the autoSelectThres( ) function is completed. If the parameter p is greater than the threshold level, the threshold value is set to the value of parameter p (step 234) and the autoSelectThres( ) function is completed.

Figure 13:
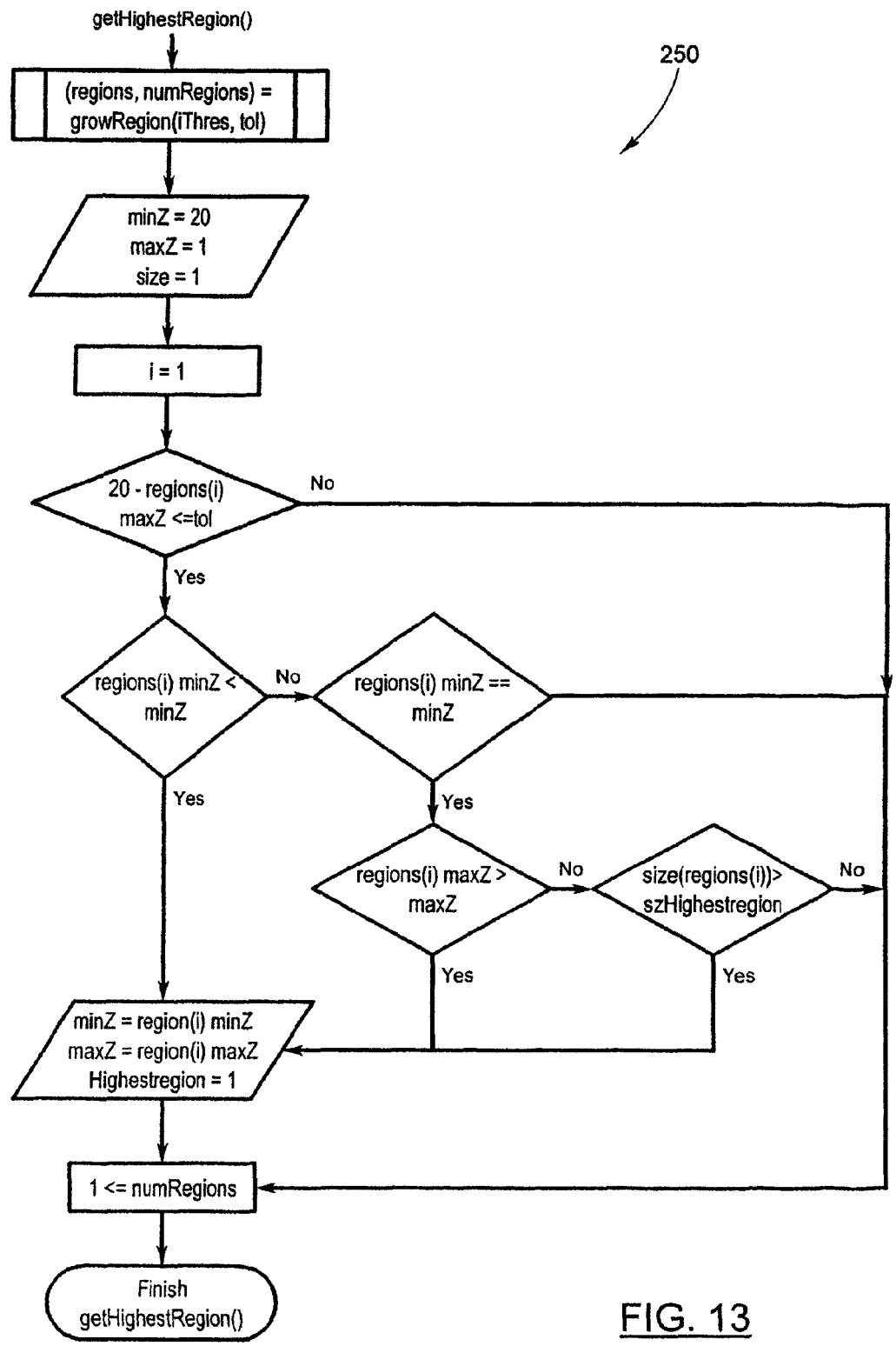
FIG. 13 is a flowchart showing the steps performed during execution of a getHighestRegion( ) function.

As mentioned above, at step 162 the findPointerMotion( ) function 120 calls the extractPointer( ) function 124 to extract the pointer from the binary image and ignore the noise. This is done by selecting the "white region" in the binary image that is greater than or equal to a certain minimum size and is the highest region (i.e. the largest in the y-axis (20 pixel axis)). Specifically, when the extractPointer( ) function 124 is called, the extractPointer( ) function calls the getHighestRegion( ) function 130 (step 250). The getHighestRegion( ) function 130 uses the threshold value and tol parameters to select the appropriate white region szRegion in the thresholded difference image. The tol parameter is used to avoid situations where board surface noise is mistaken as a pointer. FIG. 13 shows the steps performed during this function.

Once the white region szRegion has been selected, the white region szRegion is checked to see if it is greater than zero (step 252). If not, a no pointer condition is determined (step 254). If the white region szRegion is greater than zero, morphological operator of erosion and dilation are used on the white region to reduce further noise (steps 256 to 264) and the extractPointer( ) function is completed. As mentioned above, at step 166 the findPointerMotion( ) function 120 calls the centerOfMass( ) function 126 to determine the center of the pointer. During this function, the black pixels in the binary image are treated as having a mass of zero (0) and the white pixel are treated as having a mass of one (1). The physics formulae for center-of-mass are used. The equation below gives the center of mass in the x-direction:

$$C_x = \text{sum}(X_i)/M$$

where:
$X_i$ are the x-coordinates of the white pixels in the binary image; and
M is the number of white pixels in the binary image.

Figure 11:
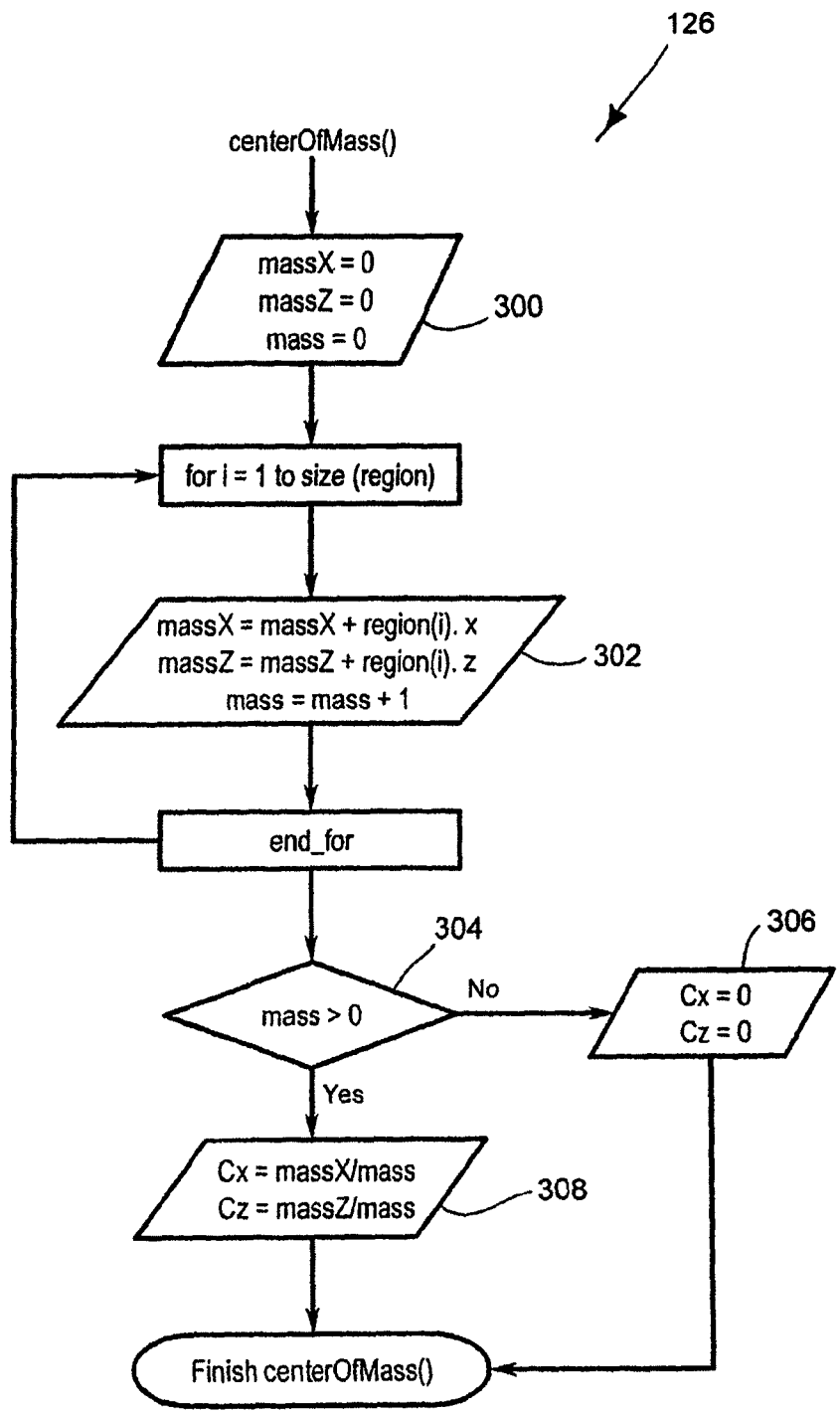
FIG. 11 is a flowchart showing the steps performed during execution of a centerOfMass( ) function.
Figure 12:
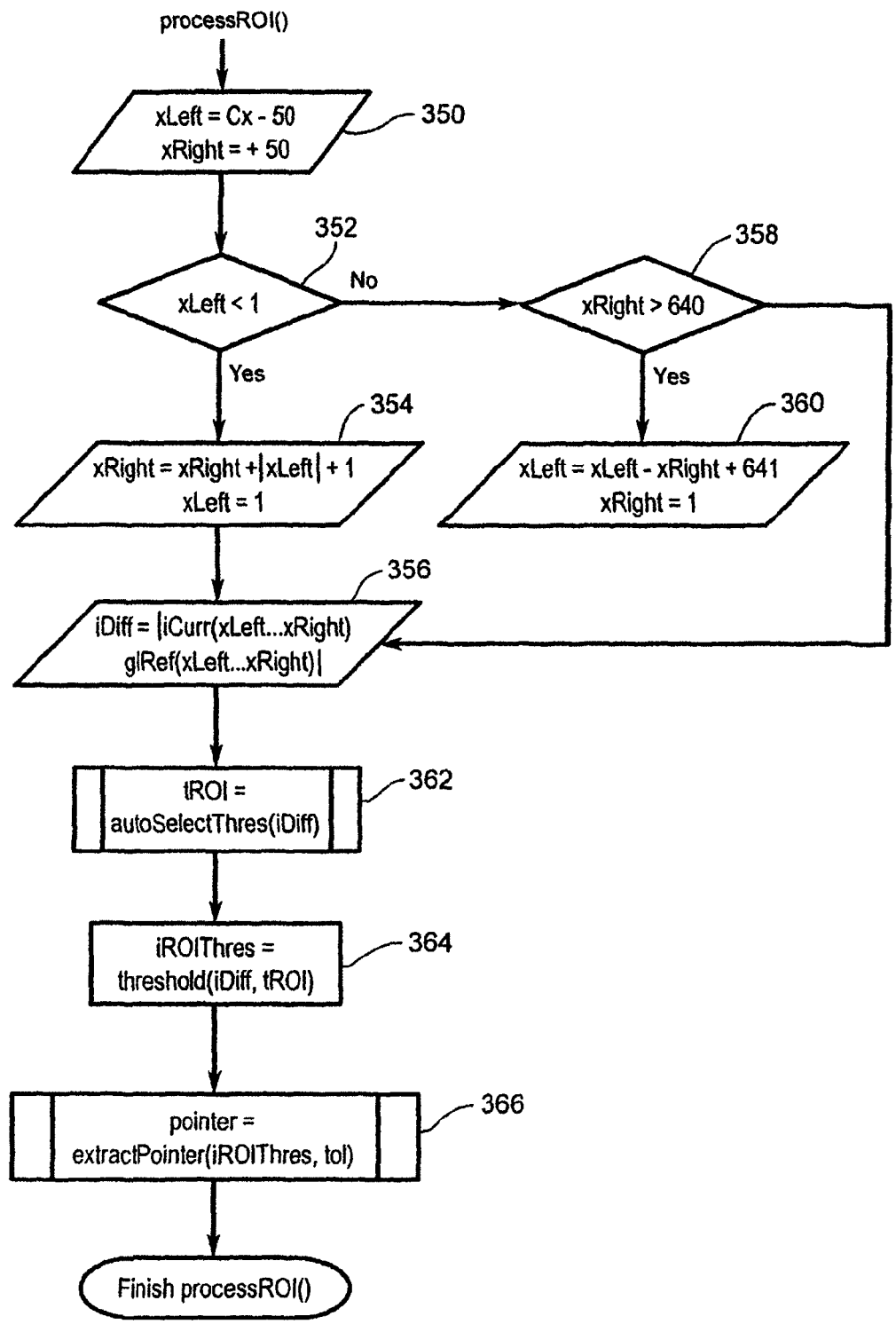
FIG. 12 is a flowchart showing the steps performed during execution of a processROI( ) function.

Initially, once the centerOfMass( ) function is executed, the center of mass parameters massX, massZ and a mass parameter are assigned zero values (see step 300 in FIG. 11). A loop is then entered to calculate the center of mass parameters massX and massZ using the above equation and to calculate the mass parameter (step 302).

Upon exiting the loop, the mass parameter is checked to determine if its value is greater than zero (step 304). If the value of the mass parameter is equal to zero, the center of mass parameters Cx and Cz are assigned values of zero (step 306) and the centerOfMass( ) function 126 is completed. At step 304, if the value of the mass parameter is greater than zero, the center of mass coordinates Cx and Cz are calculated (step 308) using the equations:

$$Cx = \text{mass}X/\text{mass}; \text{ and}$$

$$Cz = \text{mass}Z/\text{mass}.$$

Once the center of mass coordinates have been calculated, the centerOfMass( ) function 126 is completed.

Figure 15:
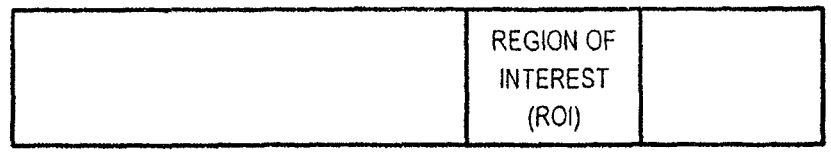
FIG. 15 shows a region of interest within the pixel subset.

As mentioned above, at step 168 the findPointerMotion( ) function 120 calls the processROI( ) function 128 to process the region-of-interest in a manner similar to the findPointerMotion( ) function 120 except, here the image size is 100×20 pixels and a calibration image including only background (i.e. no pointer) is used in place of the previous image. Upon execution of the processROI( ) function 128, xLeft and xRight parameters are calculated by subtracting and adding fifty (50) to the center of mass parameter Cx (step 350). The value of parameter xLeft is then checked to determine if it is less than one (1) (step 352). If the parameter xLeft has a value less than one (1), the parameter xRight is recalculated and the parameter xLeft is assigned a value of one (1) (step 354) to define boundaries of the region of interest as shown in FIG. 15. A difference image iDiff of the region of interest is then calculated by subtracting the region of interest of the current image from the region of interest of the calibration image gIRef determined at step 176 of the findPointerMotion( ) function 120 and taking the absolute value of the difference (step 356).

At step 352, if the parameter xLeft has a value greater than one (1), the parameter xRight is checked to determine if it has a value greater than 640 (step 358). If the parameter xRight has a value greater than 640, the parameter xLeft is recalculated and the parameter xRight is assigned a value of one (1) (step 360) to define boundaries of the region of interest. The processROI( ) function 128 then proceeds to step 356 to calculate the difference image iDiff of the region of interest. At step 358, if the parameter xRight has a value less than 640, the processROI( ) function 128 proceeds directly to step 356 to calculate the difference image iDiff of the region of interest.

Once the difference image iDiff of the region of interest has been calculated, the autoSelectThres( ) function 122 is called to select a threshold value for the difference image iDiff of the region of interest (step 362) in the manner described above with reference to FIG. 9. The difference image iDiff of the region of interest is then thresholded (step 364). Following this, the extractPointer( ) function 124 is called to extract the pointer from the difference image iDiff of the region of interest (step 366) in the manner described above with reference to FIG. 10.

Once the acquired image has been processed in the above manner, a PIP for the acquired image is created by the DSP 84. The PIP is a five (5) word packet and has a layout including camera identification, an LRC checksum to ensure data integrity and a valid tag to ensure zero packets are not valid. The valid tag indicates whether the PIP relates to a pointer characteristic packet (10), a diagnostic packet for a specific camera assembly 63 (01) or a diagnostic packet for all camera assemblies 63 (11). Table 1 below shows the PIP layout.

TABLE 1

| Word | 15 | 14 | 13 | 12 | 11 | 10 9 8 7 6 5 4 3 2 1 0 |
|---|---|---|---|---|---|---|
| Pointer Characteristics packet (generated by Camera) | | | | | | |
| 0 | Valid tag | Camera # | | | | X intercept (at Y0) |
| 1 | | Frame rate | | | | intensity/color |
| 2 | | Packet # | | | | pointer area |
| 3 | | Unused | | | | X intercept (at Y19) |
| 4 | | Unused | | Z position | | LRC checksum |
| Diagnostic Packet (generated by Camera or Master) | | | | | | |
| 0 | Valid tag | Camera # | | | | |
| 1 | | | | | | |
| 2 | | Packet # | | | | |
| 3 | | | | | | |
| 4 | | | | | | LRC checksum |

As mentioned above, each camera assembly 63 acquires and processes an image in the manner described above in response to each clock signal generated by its DSP 84. The PIPs created by the DSPs 84 are only sent to the master controller 54 when the camera assemblies 63 are polled by the master controller. The DSPs 84 create PIPs faster than the master controller 54 polls the camera assemblies 63. PIPs that are not sent to the master controller 54 are overwritten.

When the master controller 54 polls the camera assemblies 63, frame sync pulses are sent to the camera assemblies 63 to initiate transmission of the PIPs created by the DSPs 84. Upon receipt of a frame sync pulse, each DSP 84 transmits the PIP to the master controller 54 over the data bus. The PIPs transmitted to the master controller 54 are received via the serial port 96 and auto-buffered into the DSP 90.

After the DSP 90 has polled the camera assemblies 63 and has received PIPs from each of the camera assemblies, the DSP 90 processes the PIPs using triangulation to determine the location of the pointer relative to the touch surface 60 in (x,y) coordinates. Specifically, the PIPs from pairs of camera assemblies 63 are processed using triangulation.

Figure 16:
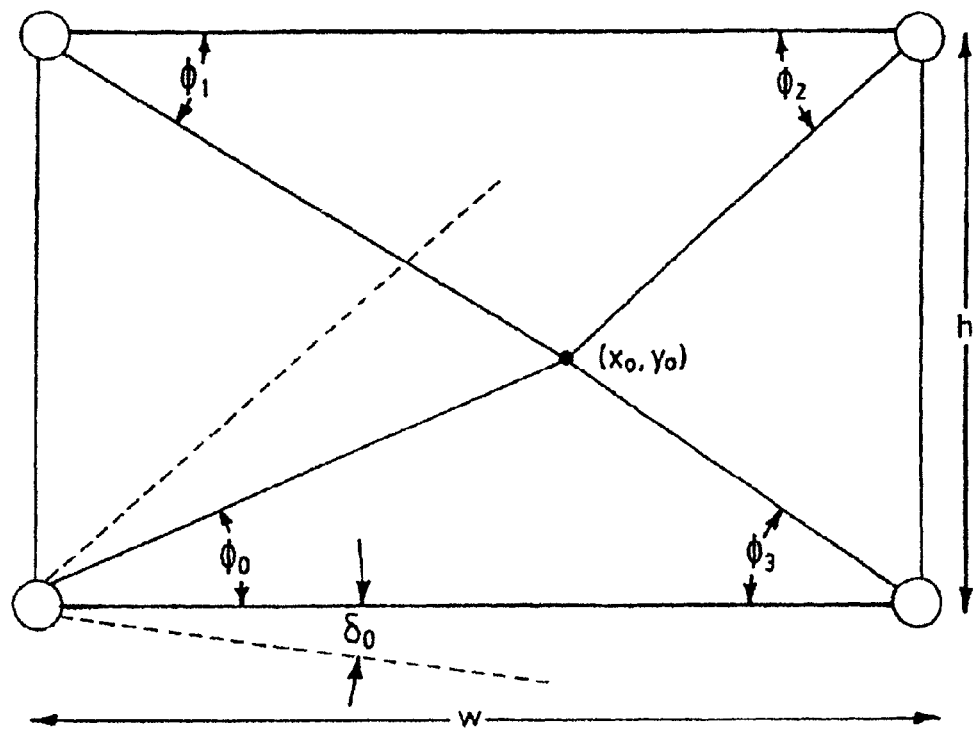
FIG. 16 shows the triangulation geometry used to calculate a pointer contact position on the touch surface of the touch screen.
Figure 17:
FIG. 17 shows an image acquired by an image sensor and lens assembly including the pointer and its median line.

FIG. 16 shows that two angles $\phi_1$ and $\phi_2$ are needed to triangulate the position ($x_0,y_0$) of the pointer relative to the touch screen 60. The PIPs generated by each camera assembly 63 include a number $\theta \in [0, \text{sensorResolution}-1]$ (see FIG. 17) identifying the median line of the pointer. The sensorResolution, in the case of the Photobit PB300 image sensor, is 640. The equations below relate the angle $\phi$ to the position $\theta$ taking into account the field-of-view of the image sensor and lens assembly 80:

$$\phi = \frac{\theta}{sensorResolution} \times F_{ov} - \delta \quad (1)$$

$$\phi = \frac{SensorResolution - \theta}{sensorResolution} \times F_{ov} - \delta \quad (2)$$

The above equations subtract away an angle $\delta$ that allows the image sensor and lens assembly 80 to have some overlap with the frame 62. The overlap with the frame 62 is desired due to mechanical tolerance issues in the frame assemblies 64 (i.e. the angle of the plate 66 can have an error of 1° to 2°). The angle $\delta$ is allowed to be negative, meaning that there is no overlap with the frame 62, in fact part of the touch surface 60 along the frame 62 is missed. Equation 1 or 2 is used to determine $\phi$, depending on the mounting and/or optical properties of the image sensor and lens assembly 80. If the image acquired by the camera assembly 63 is rotated as a result of the mounting and/or optical properties of the image sensor and lens assembly 80, then equation 2 is used. Equation 1 is used otherwise. In the present embodiment, equation 1 is used with the camera assemblies 63 positioned at the top left and bottom right corners of the touch screen 52 and equation 2 is used with the camera assemblies 63 positioned at the bottom left and top right corners of the touch screen 52.

As discussed above, equations 1 and 2 allow the pointer median line data included in the PIPs to be converted by the DSP 90 into an angle $\phi$ with respect to the x-axis. When two such angles are available, the intersection of the median lines extending at these angles from their respective camera assemblies 63 yields the location of the pointer relative to the touch surface 60.

In this embodiment, since the touch screen 52 includes four camera assemblies 63, six pairs of camera assemblies can be used for triangulation. The following discussion describes how a pointer position is determined by triangulation for each pair of the camera assemblies 63.

In order to determine a pointer position using the PIPs received from the camera assemblies 63 along the left side of the touch screen 52, the following equations are used to determine the ($x_0,y_0$) coordinates of the pointer position given the angles $\phi_0$ and $\phi_1$ for the upper and lower camera assemblies:

$$x_0 = \frac{h}{w} \times \frac{1}{\tan(\phi_0) + \tan(\phi_1)} \quad (3)$$

$$y_0 = \frac{\tan(\phi_0)}{\tan(\phi_0) + \tan(\phi_1)} \quad (4)$$

where:

h is the height of the touch screen 52 i.e. the vertical distance from camera assembly focal point-to-focal point;

w is the width of the touch screen 52 i.e. the horizontal distance from camera assembly focal point-to-focal point; and $\phi_i$ is the angle with respect to the horizontal, measured using camera assembly i and equation 1 or 2.

For the camera assemblies 63 along on the right side of the touch screen 52, the following equations are used to determine the ($x_0,y_0$) coordinates of the pointer position given the angles $\phi_2$ and $\phi_3$ for the upper and lower camera assemblies:

$$x_0 = 1 - \frac{h}{w} \times \frac{1}{\tan(\phi_2) + \tan(\phi_3)} \quad (5)$$

-continued $$y_0 = 1 - \frac{\tan(\phi_2)}{\tan(\phi_2) + \tan(\phi_3)} \quad (6)$$

The similarity between equations 3 and 5, i.e. equation 5=1−equation 3 once $\phi_2$ and $\phi_3$ have been substituted into equation 3 for $\phi_1$ and $\phi_2$ respectively should be apparent. Equations 4 and 6 are related in a similar manner. In order to determine a pointer position using the camera assemblies 63 along the bottom of the touch screen 52, the following equations are used to determine the ($x_0$,$y_0$) coordinates of the pointer position given the angles $\phi_0$ and $\phi_3$ for bottom left and bottom right camera assemblies:

$$x_0 = \frac{\tan(\phi_3)}{\tan(\phi_0) + \tan(\phi_3)} \quad (7)$$

$$y_0 = \frac{w}{h} \times \frac{\tan(\phi_3)}{\tan(\phi_0) + \tan(\phi_3)} \times \tan(\phi_0) \quad (8)$$
$$= \frac{w}{h} \times x_0 \times \tan(\phi_0)$$

In order to determine a pointer position using the camera assemblies 63 along the top of the touch screen 52, the following equations are used to determine the ($x_0$,$y_0$) coordinates of the pointer position given the angles $\phi_1$ and $\phi_2$ for the top left and top right camera assemblies:

$$x_0 = \frac{\tan(\phi_2)}{\tan(\phi_1) + \tan(\phi_2)} \quad (9)$$

$$y_0 = 1 - \frac{w}{h} \times \frac{\tan(\phi_2)}{\tan(\phi_1) + \tan(\phi_2)} \times \tan(\phi_1) \quad (10)$$
$$= 1 - \frac{w}{h} \times x_0 \times \tan(\phi_1)$$

The similarity between equations 7 and 9, i.e. equation 9=equation 7 once $\phi_1$ and $\phi_2$ have been substituted into equation 7 for $\phi_0$ and $\phi_3$ should be apparent. Equations 8 and 10 have the following relationship: equation 10=1−equation 8 once $\phi_1$ and $\phi_2$ have been substituted into equation 8 for $\phi_0$ and $\phi_3$ respectively.

In order to determine a pointer position using the camera assemblies 63 across the bottom left to top right corner diagonal, the following equations are used to determine the ($x_0$,$y_0$) coordinates of the pointer position given the angles $\phi_0$ and $\phi_2$ for bottom left and top right camera assemblies:

$$x_0 = \frac{\frac{h}{w} - \tan(\phi_2)}{\tan(\phi_0) - \tan(\phi_2)} \quad (11)$$

$$y_0 = \frac{1 - \frac{w}{h} - \tan(\phi_2)}{\tan(\phi_0) - \tan(\phi_2)} \times \tan(\phi_0) \quad (12)$$

In order to determine a pointer position using the camera assemblies 63 across the bottom right to top left diagonal, the following equations are used to determine the ($x_0$,$y_0$) coordinates of the pointer position given the angles $\phi_1$ and $\phi_3$ for the bottom right and top left camera assemblies:

$$x_0 = \frac{\frac{h}{w} - \tan(\phi_3)}{\tan(\phi_1) - \tan(\phi_3)} \quad (13)$$

$$y_0 = 1 - \frac{1 - \frac{w}{h} - \tan(\phi_3)}{\tan(\phi_1) - \tan(\phi_3)} \times \tan(\phi_1) \quad (14)$$

The similarity between equations 11 and 13, i.e. equation 13=equation 11 once °1 and °3 have been substituted into equation 11 for $\phi_0$ and $\phi_2$ should be apparent. Equations 12 and 14 have the following relationship: equation 14=1−equation 12 once $\phi_1$ and $\phi_3$ have been substituted into equation 12 for $\phi_0$ and $\phi_2$ respectively.

As will be appreciated, the above equations generate the coordinates $x_0$ and $y_0$ on a scale of [0, 1]. Therefore, any appropriate coordinate scale can be reported by multiplying $x_0$ and $y_0$ by the maximum X and maximum Y values respectively.

In the present embodiment, the DSP 90 calculates the pointer position using triangulation for each camera pair excluding the diagonal pairs. The resulting pointer positions are then averaged and the resulting pointer position coordinates are queued for transmission to the personal computer 56 via the serial port 98 and the serial line driver 94. Since the rows of pixels of the image sensor and lens assemblies 80 that correspond to actual contacts with the touch surface 60 are known, any Z-position in a PIP that does not correspond with one of these rows is by definition a pointer hover event.

Figure 18:
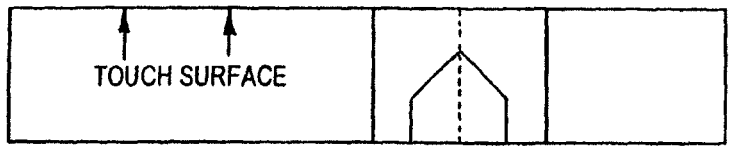
FIG. 18 shows pointer contact and pointer hover for different orientations of the pointer.
Figure 18:
Figure 18:
Figure 18:

If desired, pointer velocity and angle can be calculated by the DSP 90 as shown in FIG. 18. The velocity of the pointer is calculated by examining the changes in the Z-position (or X-intercept) of the pointer in successive PIPs and knowing the camera frame rate. For example, if the camera frame rate is 200 frames per second and the Z-position changes by 1 pixel per frame, the pointer velocity is 200 pixels per second.

The angle of the pointer can be determined due to the fact that the PIP includes the X-intercept at pixel rows 0 and 19 of the median line. Since the X distance (the difference between X-intercepts) and the Y distance (the number of pixel rows) are known, all of the information necessary to calculate the pointer angle is available.

The present invention provides advantages in that the passive touch system 50 does not suffer parallax and/or image distortion problems due to the fact that a glass or other transparent overlay over a computer or video display is not required. In addition, the present passive touch system 50 allows both pointer contact and pointer hover over the touch surface 60 to be detected by using two-dimensional image sensor and lens assemblies 80 in the plane of the touch surface 60. Pointer contact with the touch surface 60 is defined only when the pointer is in very close proximity of the touch surface. The present invention also provides advantages in that the pointer position with respect to the touch surface is not restricted since the image sensor and lens assemblies 80 look along the plane of the touch surface 60.

With respect to resolution, the resolution of the passive touch system is a function of the distances of the pointer with respect to the image sensor and lens assemblies 80, the number of pixel elements in the image sensor and lens assemblies and the fields of view of the image sensor and lens assemblies. Since image sensor and lens assemblies are available with pixel elements that range in number from tens of thousand to many millions and since the number of pixel elements in image sensors and lens assemblies of this nature is only expected to increase, the resolution of the present passive touch system 50 is high.

The passive touch system 50 also provides advantages in that alignment is automatically corrected since only pixel subsets of images that include the touch surface and the pointer are processed. In addition, the present passive touch system allows for very fast acquisition of image data since the image sensor and lens assemblies can be triggered to capture images at rates exceeding two hundred frames per second.

The present passive touch system 50 is scaleable and can include a touch surface 60 of arbitrary size. When used in conjunction with a projected computer image, the number of pixels of the image sensor and lens assemblies should be proportional to the number of pixels being displayed on the touch surface 60. For example, if a projected computer image is 1024×768 pixels, the size of the projected image is not be of concern provided the image sensor and lens assemblies 80 are able to resolve the (x,y) coordinates with sufficient accuracy with respect to the displayed pixels.

Although the passive touch system 50 is shown including camera assemblies 63 associated with each corner of the touch screen 52, those of skill in the art will appreciate that only two camera assemblies are required. In this case, the fields of view of the image sensor and lens assemblies are preferably selected so that the entire touch surface 60 is encompassed since the locations of pointer contacts are determined only when they occur within the overlapping fields of view of the camera assemblies 63.

Also, although the passive touch system 50 is described as including a projector to display the computer display output onto the touch surface 60, this is not required. No information need be displayed on the touch surface.

Although a preferred embodiment of the present invention has been described, those of skill in the art will appreciate that variations and modifications may be made without departing from the spirit and scope thereof as defined by the appended claims.

What is claimed is:

1. A method comprising:
    acquiring first and second images from different viewpoints;
    subtracting said first and second images from background images to form first and second difference images;
    processing each of said first and second difference images to determine if a region of interest within the difference image including a pointer exists therein, said region of interest being based on summed pixel intensities exceeding a threshold;
    for each region of interest, masking the pixels of the region of interest to contrast pixels representing the pointer from pixels representing the background;
    determining a position of the pointer based on pointer information calculated from the regions of interest; and
    controlling an application based on the determined position of the pointer.

2. The method of claim 1, wherein the first and second images are captured by first and second cameras looking generally across a touch surface.

3. The method of claim 2, wherein the determined position of the pointer is a relative position with respect to the touch surface.

4. The method of claim 1, further comprising determining the velocity of the pointer or the angle of the pointer, wherein the application is controlled further based on the determined pointer velocity or pointer angle.

5. The method of claim 2, further comprising determining whether the pointer is hovering above or in contact with the touch surface.

6. The method of claim 3, further comprising determining whether the pointer is hovering above or in contact with the touch surface.

7. The method of claim 2, further comprising determining the velocity of the pointer or the angle of the pointer, wherein the application is controlled further based on the determined pointer velocity or pointer angle.

8. The method of claim 3, further comprising determining the velocity of the pointer or the angle of the pointer, wherein the application is controlled further based on the determined pointer velocity or pointer angle.

9. An apparatus comprising:
    cameras configured to acquire first and second images from different viewpoints;
    and at least one processor configured to:
        subtract said first and second images from background images to form first and second difference images;
        process each of said first and second difference images to determine if a region of interest within the difference image including a pointer exists therein, said region of interest being based on summed pixel intensities exceeding a threshold;
        for each region of interest, mask the pixels of the region of interest to contrast pixels representing the pointer from pixels representing the background;
        determine a position of the pointer based on pointer information calculated from the regions of interest; and
        control an application based on the determined position of the pointer.

10. The apparatus of claim 9, wherein the first and second cameras look generally across a touch surface.

11. The apparatus of claim 10, wherein the determined position of the pointer is a relative position with respect to the touch surface.

12. The apparatus of claim 9, wherein the at least one processor is further configured to determine the velocity of the pointer or the angle of the pointer and further to control the application based on the determined pointer velocity or pointer angle.

13. The apparatus of claim 10, wherein the at least one processor is further configured to determine whether the pointer is hovering above or in contact with the touch surface.

14. The apparatus of claim 11, wherein the at least one processor is further configured to determine whether the pointer is hovering above or in contact with the touch surface.

15. The apparatus of claim 10, wherein the at least one processor is further configured to determine the velocity of the pointer or the angle of the pointer and further to control the application based on the determined pointer velocity or pointer angle.

16. The apparatus of claim 11, wherein the at least one processor is further configured to determine the velocity of the pointer or the angle of the pointer and further to control the application based on the determined pointer velocity or pointer angle.

17. A non-transitory computer-readable medium embodying computer program code that, when executed, causes an apparatus at least to:
    acquire first and second images from different viewpoints;
    subtract said first and second images from background images to form first and second difference images;
    process each of said first and second difference images to determine if a region of interest within the difference image including a pointer exists therein, said region of interest being based on summed pixel intensities exceeding a threshold;

for each region of interest, mask the pixels of the region of interest to contrast pixels representing the pointer from pixels representing the background;

determine a position of the pointer based on pointer information calculated from the regions of interest; and control an application based on the determined position of the pointer.

* * * * *